United States Patent [19]
Horvath
[11] 3,940,029
[45] *Feb. 24, 1976

[54] RECHARGEABLE SPRAYER WITH IMPROVED VALVE SYSTEM AND CHARGE CYCLE LIMIT STOP THEREFOR

[75] Inventor: William Horvath, Watchung, N.J.
[73] Assignee: Thiokol Corporation, Newtown, Pa.

[ * ] Notice: The portion of the term of this patent subsequent to Feb. 5, 1991, has been disclaimed.
[22] Filed: Dec. 13, 1973
[21] Appl. No.: 424,521

Related U.S. Application Data

[63] Continuation-in-part of Ser. No. 226,204, Feb. 14, 1972, Pat. No. 3,790,034.

[52] U.S. Cl. .................................. 222/340; 239/333
[51] Int. Cl.² ........................ B67D 5/32; G01F 11/04
[58] Field of Search ...... 222/340, 385, 394, 402.24; 239/333

[56] References Cited

UNITED STATES PATENTS

| | | | |
|---|---|---|---|
| 2,328,863 | 9/1943 | Threm | 222/402.24 X |
| 3,187,960 | 6/1965 | Gorman | 222/321 |
| 3,406,909 | 10/1968 | Pfeiffer | 222/321 X |
| 3,790,034 | 2/1974 | Horvath | 222/153 |

*Primary Examiner*—Drayton E. Hoffman
*Assistant Examiner*—Francis J. Bartuska
*Attorney, Agent, or Firm*—Stanley A. Marcus; Thomas W. Brennan

[57] ABSTRACT

A manually operated, hand-held, rechargeable, liquid spraying device having a non-pressurized, refillable or non-refillable container, is disclosed. The sprayer, a completely contained device, comprises a charging mechanism whereby, upon rotation of one part relative to another part, a movable piston is displaced vacating a charge chamber which, simultaneously, is charged with liquid. Displacement of the piston compresses a responsor or spring which, in turn, causes the piston to exert a hydraulic pressure on the liquid now in the chamber vacated by the piston. Hydraulic pressure on the charge chamber liquid is maintained by the closing of a one-way, elastomeric resilient valve in the entrance in the chamber, which closing occurs when the piston halts in its movement. A push botton flow control valve, when operated, permits liquid to flow from the charge chamber to an outlet nozzle through associated conduit means, being urged therethrough by the piston which is moved back into the charge chamber under the urging of the responsor or spring.

28 Claims, 10 Drawing Figures

RECHARGEABLE SPRAYER WITH IMPROVED VALVE SYSTEM AND CHARGE CYCLE LIMIT STOP THEREFOR

CROSS REFERENCE TO PRIOR APPLICATION

This application is a continuation-in-part of application Ser. No. 226,204, filed Feb. 14, 1972, now U.S. Pat. No. 3,790,034 by William Horvath.

BACKGROUND OF THE INVENTION

1. Field of the Invention

The invention hereinafter to be described is a hand-held, rechargeable sprayer which through a unique arrangement of valves and charging means in combination with a fluid discharge nozzle produces a mist or fine spray comparable to that found in aerosol type sprayers now in widespread use throughout the western world. However, aerosol sprayers have many disadvantages, chief among which is the necessity to precharge them, usually under very high (relatively) pressures with a propellant such as freon or the like. In addition, usually the entire contents are subject to this high pressure, and hence the container must be of high pressure design. Further, these prior art devices often retain high residual pressure even when in the so-called "empty" condition, thus when discarded are potentially dangerous.

2. Description of the Prior Art

Devices now currently enjoying favor in the art of atomizing dispensers include the manually operated rechargeable sprayer described in U.S. Pat. No. 3,471,065 to C. E. Malone. In this device an inner chamber is charged in response to a downwardly directed force applied to the device. This results in one portion telescoping into another portion, which action effects a pumping action by compressing a spring and simultaneously drawing liquid into a chamber below a piston. Since the piston is urged against the liquid, and a valve below the liquid in the chamber entrance closes, the liquid is trapped therein until released by an appropriate discharge device.

However, while the above sprayer is advantageous over aerosol bombs and other pre-pressurized devices, it does have certain practical limits insofar as pressure chamber volume is concerned, because by use of the telescoping mechanism its length must be increased, either to charge or discharge, hence the capacity of the charge chamber is, of necessity, limited, and severely so.

Other prior art sprayers include the hand-held type which operate by a steady application of hand action i.e., triggering, squeezing etc., to pump liquid. While these devices enjoy relatively wide-spread usage, because, primarily, they are low in cost, they do have the disadvantage of poor spray rate control, poor atomization, and from a user standpoint, require much physical effort to operate.

Accordingly, these disadvantages, inherent in the above and in other prior art devices of similar form and construction, are believed overcome by the herein to be presented invention as will be more apparent from the description which follows.

SUMMARY OF THE INVENTION

This invention relates to improvements in liquid spraying devices. More particularly it relates to improvements in the relatively small hand-held devices which desirably produce spray mists as fine as, or finer than, that produced by the aerosol spray bombs and triggering devices. Most particularly, this invention relates to rechargeable sprayers of type referred wherein, not only is a fine mist spray developed, but the rate of discharge thereof, including start-up flow and shut-off are effected smoothly, substantially without over flow, i.e., shut down drool, but in a pattern most pleasing to the user.

It is therefore, an object of the present invention to provide an efficient, yet simple in operation and construction, rechargeable liquid spraying device, low enough in cost to provide the average person with a refillable, or throwaway, i.e., non-refillable, hand-operated sprayer for spraying in a mist the many liquids commonly used today, i.e., hair sprays, perfumes, toilet water, deodorants, insecticides, as well as for use in other fields such as in the medical field to provide a safe and reliable device for accurately controlled, sterile dispensing of antibiotics, medical alcohol, and other medicines in hospital operating rooms and the like.

Another object is to provide a rechargeable liquid spraying device which is easily held in the hand and which, when charged may be operated in any position or attitude by finger actuation of a push buttom type of valve control.

An additional object is to provide a rechargeable liquid sprayer of the character described which may be charged from most any position or attitude so long as liquid remains within the container portion of the invention.

A further object is to provide a rechargeable liquid spraying device of the character described which is completely safe, requires no outside power and which is capable of dispensing liquid under high pressure in the form of a fine mist, but wherein the bulk of the liquid stored in the device is subjected to atmospheric pressure only, thereby avoiding the explosion hazards of the common aerosol type sprayer.

A still further object of this invention is to provide a rechargeable liquid spraying device of the character described which requires no pressurizing gas to be contained within it, nor other foreign propellant thereby avoiding the problems of contamination and dilution of the liquid product to be dispensed as well as circumventing inherent problems in the use of pre-pressurized devices.

Still another object of this invention is to provide a rechargeable liquid sprayer of the character described which is further characterized by precise control of flow initiation, steady flow and shut-off as a result of the utilization, in combination therewith, of an improved internal elastomeric resilient valving and conduiting system.

A still additional object of this invention is to provide a rechargeable liquid sprayer of the character described which is further characterized by the incorporation therein of means for determining the end of a charging cycle.

Other objects, features and advantages of the present invention will become apparent from the following detailed description taken in connection with the accompanying drawings in which:

DESCRIPTION OF THE PREFERRED EMBODIMENT

Figure 1:
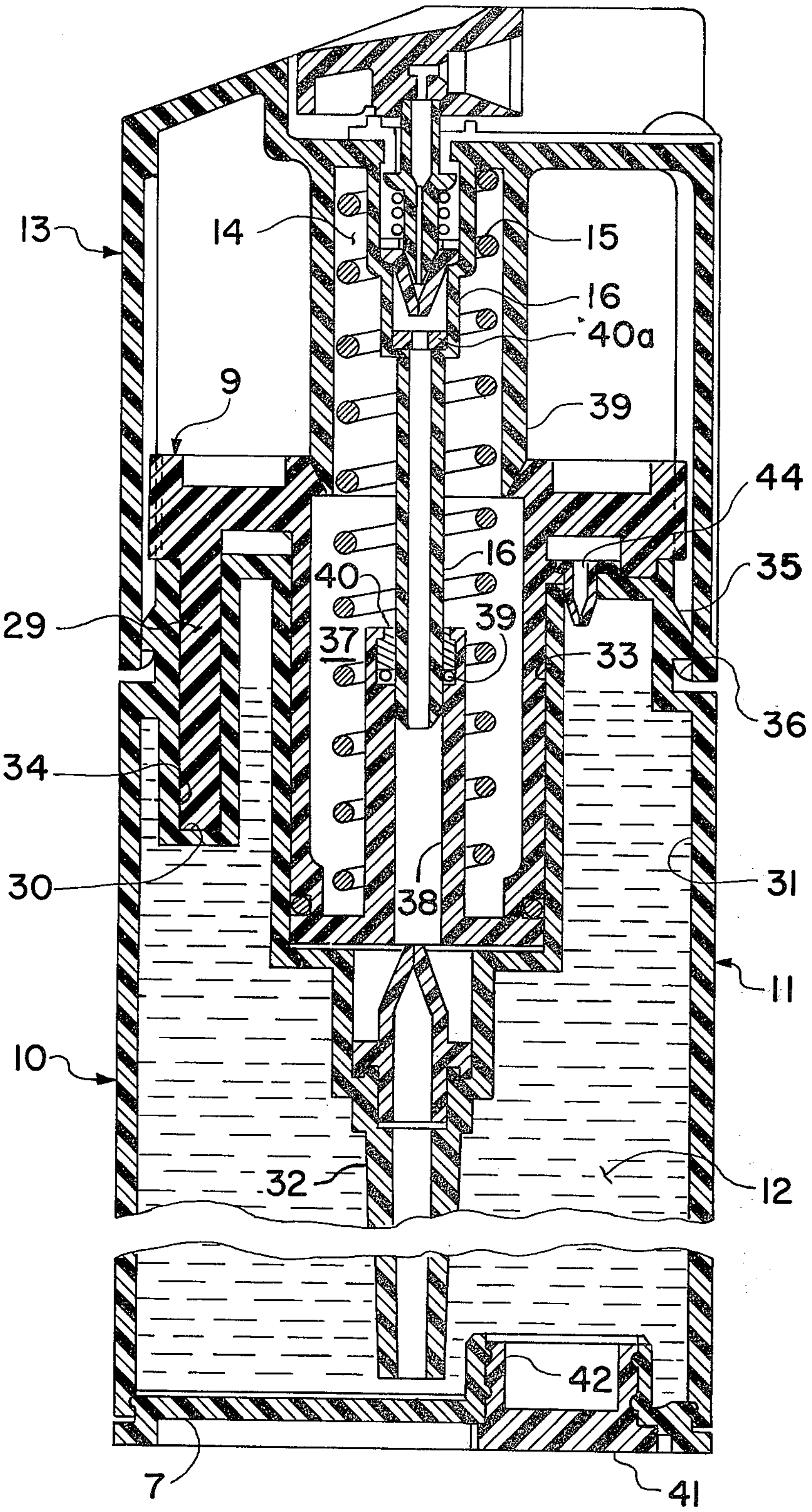
FIG. 1 is a central longitudinal sectional view of an apparatus employing the invention showing same loaded with liquid but as yet uncharged.
Figure 2:
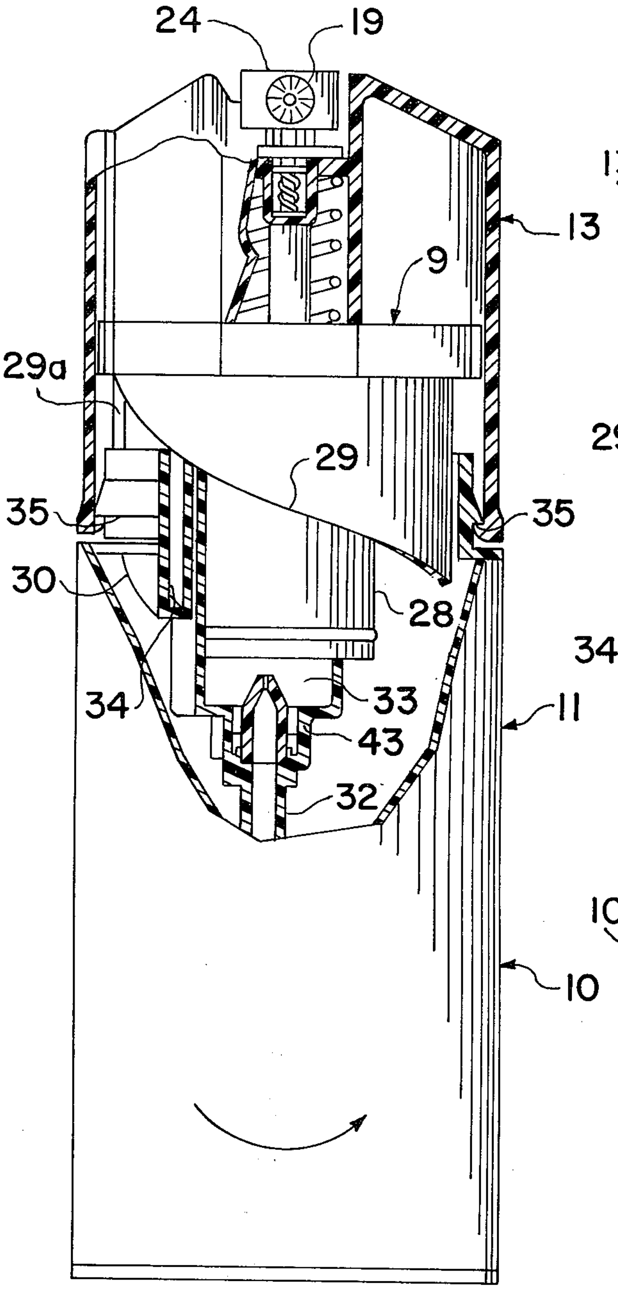
FIG. 2 is a view similar to FIG. 1, partially sectioned, showing the device in an intermediate state of charge or pressurization and showing some of the internal parts thereof.
Figure 3:
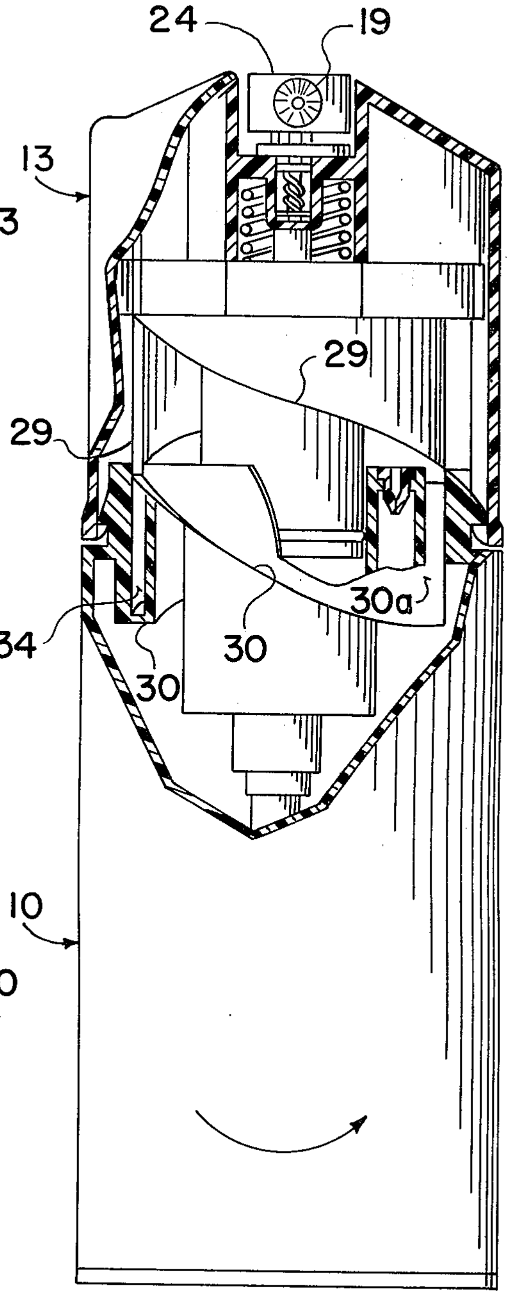
FIG. 3 is a view similar to FIGS. 1 and 2, partially sectioned, showing the invention in a completely charged or pressurized state ready for spraying operation and showing additional internal parts.

Referring now to the accompanying drawings, in particular to FIGS. 1 through 3 thereof there is shown a preferred embodiment of the invention, comprising a liquid spraying device 10 which preferably is dimensioned to be conveniently held in the hand, much in the same manner as the well known aerosol bomb sprayer of the prior art. In general, spray device 10 comprises a separable cylindrical container 11 for storing a quantity of liquid 12 to be sprayed, and a cap or spray housing 13 rotatably mounted thereon. Container 11 and spray housing 13 as will be seen, comprise a pair of main sub-assemblies of sprayer 10. In FIG. 1, cap or housing 13 comprises a generally cylindrical recess 14 depending from the top thereof for receiving one end of a biasing member, pressurizer or responsor 15 in the form, shown here for illustration, of a coiled spring, and an outlet conduit 16 centrally disposed in recess 14. It should be readily apparent that other forms of biasing or pressurizing members can be used for responsor 15. Thus flat, Belleville washer type springs either in the form of a single element or stacked into a long biasing chain can be used and such will no doubt occur to the skilled artisan. Further, responsor 15 need not be of metal, as many plastics now becoming available which have relatively high density and excellent "memory" can be utilized. Polyethylene and polypropylene are examples of such plastics.

Outlet conduit 16 terminates in sealing engagement in a central tube 38 formed in a piston 9. Tube 38 at its top (see FIG. 1) is fitted with a liquid seal 39, in this instance an O-ring, although many other suitable seals will occur to skilled artisans. Seal 39 is retained in tube 38 and by a retainer 40 and provides a seal against liquid leakage between tube 38 and the lower end of outlet 16. A control orifice 40*a* is fitted in conduit 16 and can be sized for any desired liquid flow rate therethrough.

Figure 5:
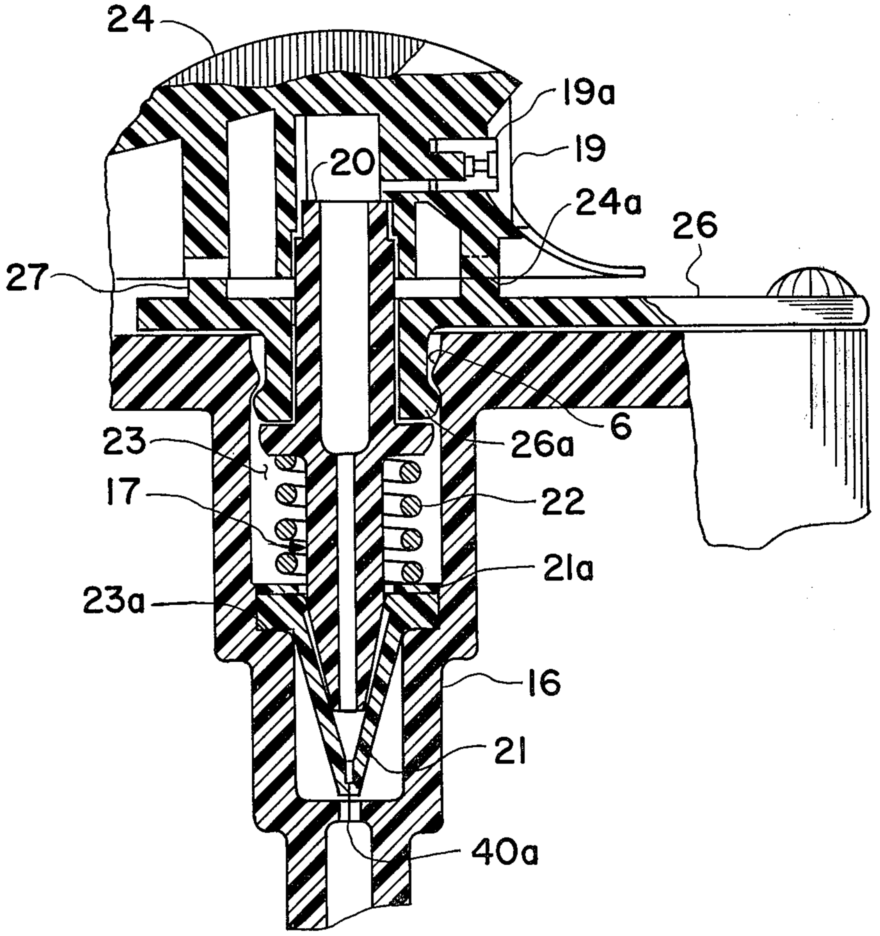
FIG. 5 is a partial, sectioned and expanded view of the spray nozzle, push button, control valve, and safety lever, the latter in the "Off" position.

In the top of outlet conduit 16, referring now to FIG. 5 wherein the parts to be described are shown in clearer detail, is a discharge valve 17 comprising a movable stem 20, a partially precompressed spring 22 positioned in a cavity 23 so as to urge stem 20 against the bottom surface of a collar 26*a* of a safety lever 26 described hereinafter.

Collar 26*a* is retained in cavity 23 by a formed shoulder 6 at the entrance to cavity 23. The upper portion of stem 20 terminates in sealing relationship in a push button 24 containing a discharge nozzle 19. Stem 20 is formed with a central flow passage which is flow connected to its lower end to control orifice 40*a* through a flexible and resilient valve member 21 and at its upper end to nozzle 19. Valve member 21 terminates at a point proximate to orifice 40*a* and is positioned in cavity 23 at the bottom thereof on a shoulder 23*a* being held in sealing relation thereat by a retainer 21*a*. Member 21 is formed of resilient, preferably elastomeric material, e.g. polyvinyl chloride, polyethylene or polypropylene, although any material, or combinations of materials which have sufficient flexibility can be used. In the position shown valve member 21 is closed, however, as will be hereinafter explained, it can be opened to permit fluid to flow from tube 38 into conduit 16 through orifice 40*a*, valve member 21 and stem 20 and discharged through nozzle 19.

Safety lever 26 is mounted on stem 20 between push button 24 and valve assembly 17, in the entrance to cavity 23 by engagement of collar 26*a* with shoulder 6. Lever 26 has two positions; in one position a plug 27 engages the underside 24*a* of button 24 and prevents downward movement thereof. In the other position stop 27 comes into register with a recess (not shown) in the bottom of button 24 and normal movement of push button 24 is permitted. Thus, incorporation of lever 26 endows sprayer 10 with an "On-Off" capability simply and economically.

Figure 6:
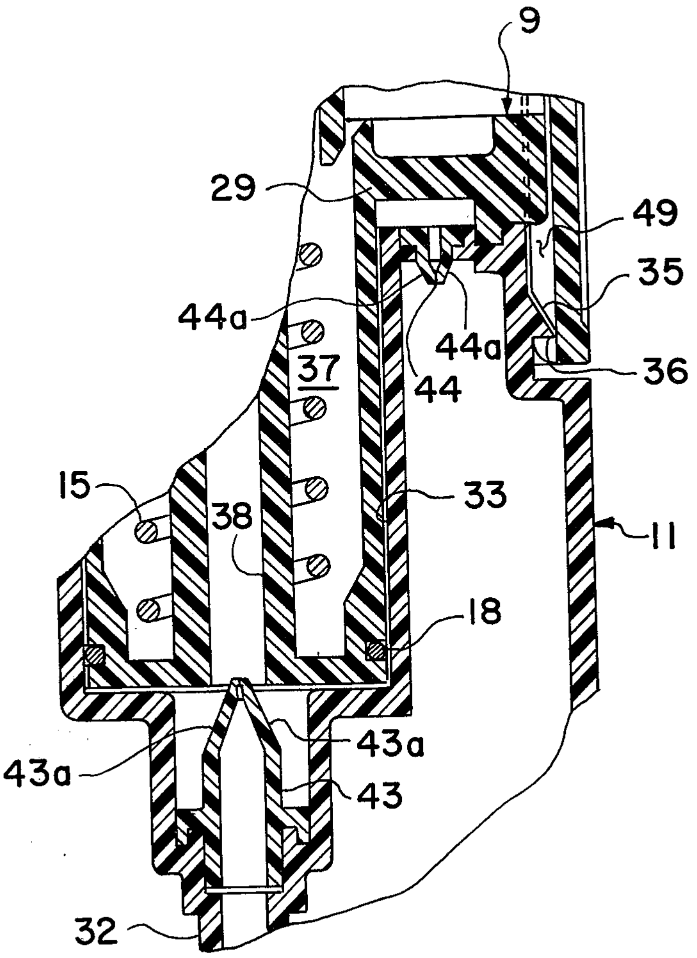
FIG. 6 is a partial, expanded sectional view of a portion of FIG. 1, in particular the central and mid upper right-hand portion thereof illustrating the pressure chamber inlet valve and the air inlet valve, together with a portion of the piston and charge, or pressurization chamber.

Referring again to FIG. 1, tube 38 of piston 9 is formed at its upper end with grooves to accomodate seal 39 and seal retainer 40. The lower end of piston 9 comprises a ram end 28 (see FIG. 2) on the outside periphery of which a seal groove is formed to receive a ram end seal 18 (see FIG. 6) the one shown being a preferred type of O-ring although other sealing means well known to the skilled artisan will serve the purpose.

Container 11, the second of two main sub-assemblies, comprises a receptacle 31 for holding a quantity of liquid 12. An inlet conduit 32 is centrally positioned therein and extends downwardly to a point just above the bottom wall, or cover 7 of container 11. In the embodiment shown wall 7 is adapted to receive, in a threaded fitting 42, a removable filler plug 41, for filling reservoir or receptacle 31 with liquid 12. On the other hand, container 11 can be filled and factory sealed prior to shipment and such is contemplated as being within the scope of the invention. Bottom wall or cover 7 can be pressed on to form a tight seal; however, other sealing methods such as ultra-sonic welding or heat sealing can easily be employed to close cover 7 more or less permanently.

Central inlet conduit 32 terminates in a fast response, resilient, preferably elastomeric, inlet valve 43, which permits liquid to flow from conduit 32 into charge chamber 33 when open. A liquid pressure differential caused by upward movement if piston 9, causes the side walls 43*a* to spread apart, permitting liquid to flow into chamber 33 through valve 43. However, when piston 9 ceases upward movement the pressure differential dissipates and side walls 43*a* reclose instantly due to their resilient nature and liquid is instantaneously estopped from flowing in the opposite direction.

A similarly constructed air inlet check valve 44 is sealingly fitted in container 11 in the top region thereof and is operated to permit air from outside the device replace the liquid which flows into chamber 33. Valve 44, constructed of materials similar to valve 43, expands in its side wall portions 44*a* (see FIG. 6) to permit air to flow in, then closes due to its elastomeric and therefore resilient construction to prevent air from flowing out of container 11.

Figure 7:
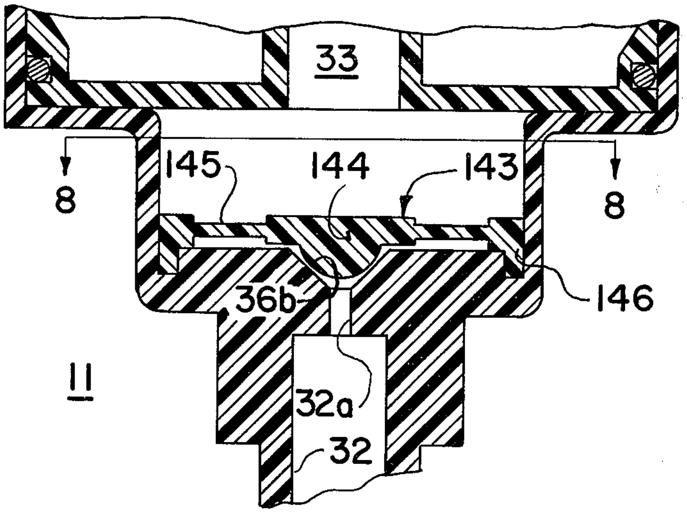
FIG. 7 is a partial, expanded sectional view, similar to FIG. 6, showing a modified form of charge chamber inlet valve.
Figure 8:
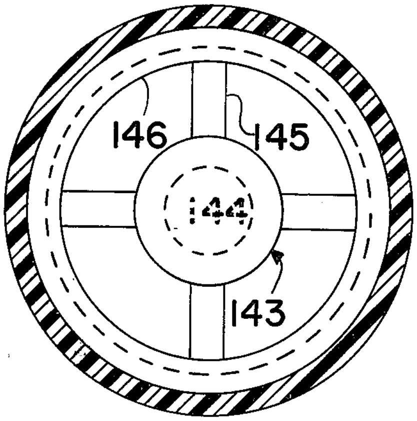
FIG. 8 is a view taken along line 8—8 of FIG. 7.

In FIGS. 7 and 8 is shown an alternate embodiment of a one-way or check valve arrangement which can be utilized in place of valves 43 or 44. FIG. 7, a sectional view of the inlet conduit 32 portion of the invention, terminates in an orifice 32*a* and a substantially conical valve seat 32*b*. Fitted over orifice 32*a* in seat 32*b* is a flexible elastomeric valve 143 sealingly engaged thereat in the body of container 11. Valve 143 comprises a ball-cock valve element 144 and one or more suspension arms 145 which are formed so as to be thinner in cross section than element 144. Arms 145 are conjoined to a peripheral collar 146 which is sealingly fitted in a suitable recess formed in the bottom of the entrance to chamber 33 as shown in FIG. 7. Valve 143 is preferably an elastomeric resilient material such as any of the many plastics well known in the art, e.g., polyvinyl chloride, polyethylene, polypropylene. Also synthetic and natural rubber can be used. By forming radial arms 145 to have a thinner cross section than central ball cock element 144, flexibility in this portion of valve 143 is increased and action of ball cock member 144, in response to pressure changes in conduit 32, is enabled to respond with increased speed to shut-off and/or initiate liquid flow from and into chamber 33. It should also be understood that a construction such as valve 143 can also be used in place of air inlet valve 44.

Referring now to FIG. 2, 3 and/or 6, container 11 is formed with a peripheral, bevelled rim 35, which engages with a peripheral ridge or shelf 36 in cap or spray housing 13, and has a pair of charging members comprising surfaces 30 of substantially helical form in similarly formed recesses or tracts 34. Charging members 30 operatively contact in slidable relation the bottom surfaces of a pair of runners or cam-like follower elements 29, integrally formed on piston 9, to be referred to more fully hereinafter.

Figure 4:
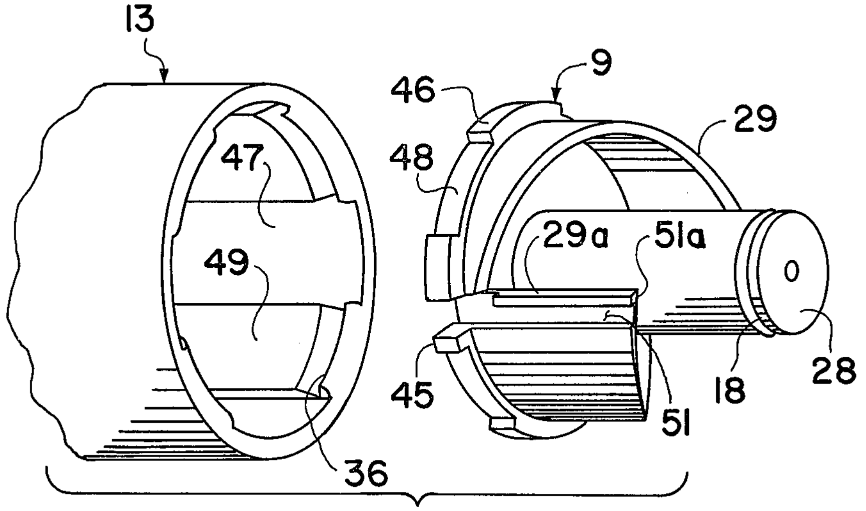
FIG. 4 is a pictorial, exploded view of the cap and piston portions of the invention, partially cut away showing the relationship of these parts when assembled.
Figure 6A:
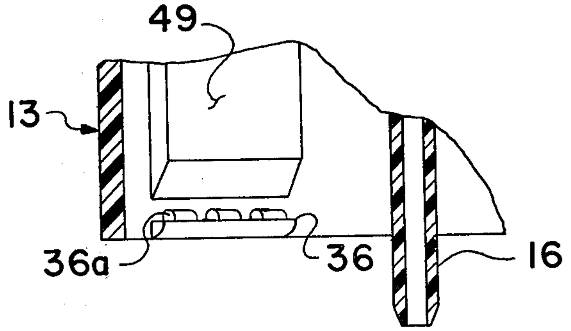
FIG. 6A is a partial sectional view of a portion of the cap or spray housing forming a part of the invention.

Referring now to FIG. 4 there is shown in an exploded view, cap 13 and piston 9 illustrating the operating relationship of these members when assembled. Cap 13 is formed with inner peripheral splines or keys 49 and adjacent spline recesses or keyways 47, which engage with corresponding recesses 48 and keys 46 respectively on peripheral skirt 45 of piston 9. Also in FIG. 4, and more particularly in FIG. 6A, are peripheral ridges, shelves, or notches 36 in the bottom of splines 49 which engage bevelled or chamfered rim 35 on container 11 elsewhere described. In FIG. 6A notches 36 include a set of bearings or ribs 36*a* formed on the upper surface thereof which, as will be explained, permit easier rotation of container 11 with respect to cap 13. Piston 9 when assembled with cap 13 is slidably movable therein over splines 49 and keyways 47 on recesses 48 and keys 46.

Having described sprayer 10 and its several parts, it should be evident that what has been presented as a genuine advance in the art of dispensing and spraying in a unique combination of elements and parts, economical to produce since all of its parts can be made of plastic, a particularly preferred plastic material being polypropylene. It is also to be noted that sprayer 10 is easily assembled by unskilled labor, the various parts thereof being arranged in subassemblies which are thereafter assembled to produce the complete unit. For example, piston 9, fitted with seals 18 and 39 and retainer 40 make a subassembly. Container 11 preassembled with resilient elastomeric one-way liquid and air inlet valves 43 and 44 pressed into their respective seats, bottom cover 7 with filler plug 41 in fitting 42 thereon makes another subassembly. Preassembled piston 9 can then be assembled in container 11 by inserting cylindrical ram end 28 thereof into chamber 33. Responsor 15 can then be positioned on piston 9 over central tube 38.

Cap 13 with valve 17 including valve member 21, retainer 21*a*, stem 20 and spring 22 installed in recess 23 by pressing it past shoulder 6 in the opening on top of cap 13, makes still another subassembly. Stem 20 compresses spring 22 slightly and assumes the position shown in FIG. 5, with the end thereof abutting the inside of walls of valve 21. Safety lever 26 is positioned over stem 20 until collar 26*a* thereof passes beyond shoulder 6 as shown. Push button 24 including nozzle 19 is then assembled over the upper end of stem 20 insuring that plugs 27 are in proper position to permit lever 26 to move back and forth around stem 20 into its "On" or "Off" positions as desired, complete cap 13 subassembly.

Cap 13 subassembly is now ready for assembly with subassembly container 11. To complete assembly of sprayer 10 cap 13 is inverted and placed over container 11 with piston 9 therein with responsor or charging spring 15 protruding from the responsor recess 37 around tube 38, and firmly pressed down, compressing spring or responsor 15, until notches 36 snap into place over bevelled rim 35 on container 11. Sprayer 10 is now completely assembled and ready for filling with liquid which can thereafter be charged and sprayed as desired.

Figure 9:
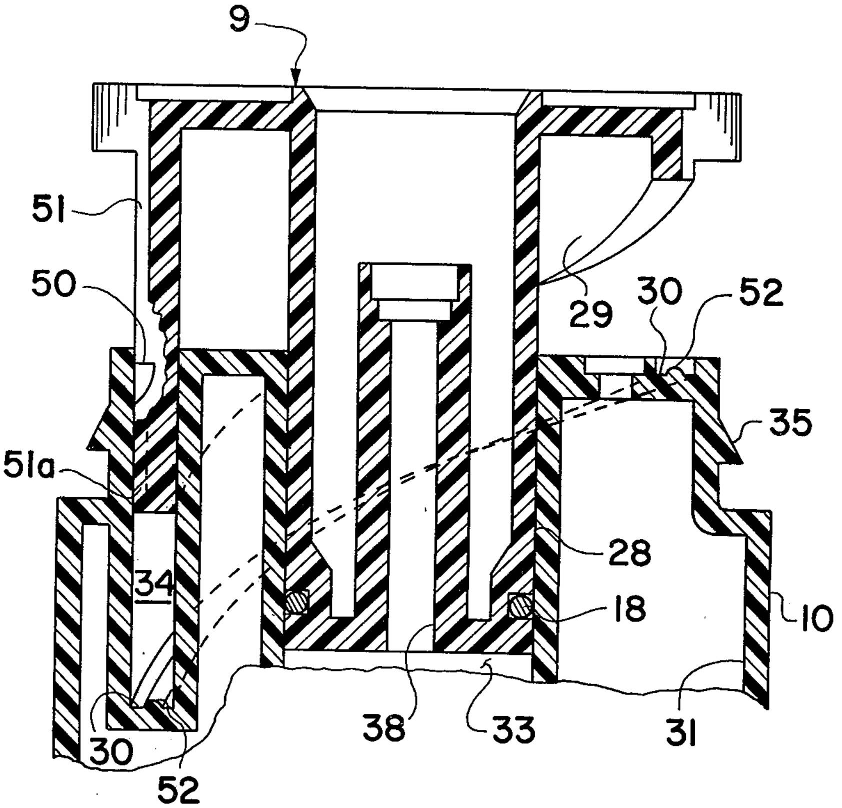
FIG. 9 is a cross section of a portion of the container and piston, certain items removed from each part, showing the relation of one to the other when assembled, a portion of the piston being broken away to show one of the charging cycle limit stops on the container.

Referring now to FIG. 9, there is shown in section a portion of container 11 and piston 9 in partial assembled relation, certain parts such as seals 39, back-up retainer 40, and inlet valve 44 not shown. In the left side of FIG. 9, a portion of sectioned piston 9 is broken away to reveal one of at least a pair of charge cycle limit stops 50 formed near the top of container 11 (only one shown), in spaced relation to the top ends of charging member surfaces 30. Piston 9 has a pair longitudinally extending slots 51, one in each of follower elements 29 (one shown-see also FIG. 4) which are spaced inwardly from vertical surfaces 29*a*, a distance such that a lip 51*a* on element 29 passes between limit stop 50 and ends of surface 30. As will be seen in the following passages stops 50 provide a means for determining the end of the charging cycle of sprayer 10.

Also in FIG. 9, charging member surface 30 is shown as being formed with a generally hemispherical bearing track or bead 52 thereon to facilitate charging of sprayer 10.

OPERATION OF THE INVENTION

In operation of the present invention, receptacle 31 in container 11 is filled with liquid to be sprayed, or dispensed, and sprayer 10 is charged. To charge, sprayer 10 is grasped in the left hand by cap 13 and held tightly. Container 11 is then grasped with the right hand and rotated to the right (arrows in FIGS. 2 and 3). Cap 13, as stated above, is held stationary during rotation of container 11, which rotation in the preferred embodiment is 180°, or until a slight click is heard, and further rotation is resisted since the bottom ends of follower elements or runners 29 of piston 9 abut limit stops 59 on container 11, thereby indicating sprayer 10 is fully charged. Rotation of container 11 causes charging means surfaces 30 to rotate which in turn causes piston 9 to rise up into cap 13, since runners 29 are contacted thereby in tracts 34. Piston 9 slides up into cap 13 on keys 46 and keyways 48 of skirt 45 in corresponding keyways 47 and keys 49, compressing charging spring or responsor 15 ahead of it. As piston 9 begins to rise, ram end 38 leaves the bottom of chamber 33 creating a slight vacuum therein. The slight pressure differential upstream of valves 43 and 44 opens them by expansion permitting liquid 12 to flow into chamber 33 and air to flow into receptacle 31. As shown in FIG. 2, piston 9 is just beginning its upward stroke, liquid 12 is filling the partially vacated chamber 33 and valve 43 is open. If at this point rotation of container 11 ceases, the liquid already in chamber 33 will remain therein being under pressure caused by responsor 15, which pressure will cause check valves 43 and 44 to close because of their resilient construction, trapping the liquid. As rotation of container 11 is resumed, piston 9 reaches the position shown in FIG. 3 and sprayer 10 is now fully charged. It should be understood that sprayer 10 can be charged to any intermediate position between the positions of FIGS. 1 and 3, the only difference with respect to spraying being that in an intermediate charge position runner or cam follower 29 action is slightly different, as will be more fully explained in the following description of the spraying operation.

Assuming now that sprayer 10 is fully charged as in FIG. 3, spraying operation can now begin and botton accomplished by placing the index finger or push button 24 and applying a downward pressure thereagainst. This action causes stem 20 to move downwardly, pressing against the inside wall of valve element 21, forcing it to open. Liquid from chamber 33, central tube 38 and outlet conduit 16 then passes through valve element 21 into stem 20 internal flow passages and out through nozzle 19. Nozzle 19 flow passages can, of course, be sized to give as fine a mist spray as desired. It is also intended and contemplated, to enhance liquid atomization, that the various liquid passage surfaces in nozzle 19 and stem 20 have swirl inducers formed therein including the incorporation of swirl chamber 19*a* in FIG. 5. Such devices optomize liquid breakup which results in finer sprays and mists.

It should, of course, be understood that sprayer 10 can be charged by rotating cap 13 while container 11 is held stationary, since piston 9 upward movement is the same.

As liquid 12 is discharged from nozzle 19, piston 9 is forced downwardly into chamber 33 by charging spring or responsor 15, forcing liquid 12 up through tube 38 and into outlet conduit 16. The motion of piston 9 is downward along a linear path on the vertical surface 29*a* of runner or follower 29 in slidable contact with the corresponding vertical surface 30*a* of charging cam 30, with lip 51*a* passing between limit stop 50 in slot 51 and the ends of surfaces 30. When fully discharged sprayer 10 and its various working parts will appear as shown in FIG. 1, i.e., piston 9 ram end 28 occupying chamber 33 and runner or follower 29 bottomed on charging cam 30 in recess 34. Of course, the level of liquid 12 is receptacle 31 will be somewhat lower being diminished by the amount sprayed.

As hereinbefore mentioned, sprayer 10 can be charged to any intermediate position by simply ceasing rotation of container 11. However, when spraying liquid with piston 9 in any position short of fully charged, piston 9 will move down in a helical path, since charging cam 30 is helical, on follower 29 until it again assumes the position shown in FIG. 1.

There has been provided a unique and improved, manually operated spray device, having incorporated therein a unique and fast acting valving system which in combination with its charging mechanism adds to the art of sprayers, a more efficient, extremely sharp cuttoff, non-drooling rechargeable, pressurized sprayer dispenser not heretofore available. Therefore, from the description of its mode of operation and unique assembly features, it will be readily apparent that variations in its mode of operation, manufacture and assembly will occur to skilled artisans without departing from the spirit and scope thereof. Therefore, what is sought to be protected by Letters Patent is set forth in the claims appended hereto, and no limitations as to modifications and changes are to be placed thereupon except as defined in said appended claims.

What is claimed is:

1. In a rechargeable liquid spayer comprising a rotatable container including a receptacle for holding a quantity of liquid, an opening for filling the receptacle with liquid, an inner, pressurizable chamber adapted to receive a charge of liquid from said receptacle, liquid conduit means for conducting said liquid charge from said receptacle to said chamber, a spray cap rotatably mounted on said container, a piston in said cap adapted to move therein and in said chamber, charging means on said container operatively associated with said piston for moving said piston in said cap and in said chamber when said container is rotated relative to said cap, compressible means in said cap positioned therein in biasing relation to said piston, a spray nozzle on said cap including; associated liquid conduit means communicating with said chamber, liquid discharge control means in said conduit for controlling discharge of liquid from said chamber, and differential pressure operated fluid control means in said container for controlling the passage of said liquid charge into said chamber and venting said receptacle to the atmosphere, the improvement comprising;

said differential pressure operated fluid control means comprising, a first valve element sealingly positioned in said receptacle liquid conduit means proximate one end of said charge chamber, said element having a hollow, resilient body and side walls, said side walls adapted to move apart in response to fluid pressure inside said body to expand said body and open said valve permitting liquid to flow into said chamber; and, a second valve element sealingly fitted to said container having a hollow, resilient body and side walls, said side walls adapted to move apart in response to fluid pressure inside said body to expand said body and open said valve permitting air to flow into said receptacle.

2. The sprayer of claim 1 wherein said opening filling said receptacle is a recloseable plug.

3. The sprayer of claim 1 wherein said compressible means biasing said piston urges said piston away from said cap.

4. The sprayer of claim 1 further including means mounted under said spray nozzle for rendering said nozzle inoperable in one of two positions and operable in the other of said two positions.

5. The sprayer of claim 1 wherein the charging means is a cam.

6. The sprayer of claim 1 wherein said elements of said differential pressure operated fluid control means is a plastic selected from the group consisting of polyvinyl chloride, polyethylene, polypropylene, synthetic rubber and natural rubber.

7. The sprayer of claim 1 further including means on said container for determining the end of the charging stroke of said piston in said chamber.

8. The sprayer of claim 3 wherein the biasing means is a spring.

9. The sprayer of claim 6 wherein the spring is a coiled spring.

10. The sprayer of claim 7 wherein the spring is a flat spring.

11. In a rechargeable liquid sprayer comprising; a rotatable container, including a receptacle for holding a quantity of liquid, an opening for filling said receptacle with said liquid, an inner pressurizable chamber adapted to receive a charge of liquid from said receptacle, liquid conduit means for conducting said liquid charge from said receptacle to said chamber having a chamber and a receptacle and, a spray cap rotatably mounted on said container, a piston in said cap adapted to move therein and in said chamber, charging means on said container operatively connected with said piston for moving said piston in said cap and in said chamber when said container is rotated relative to said cap, compressible means in said cap positioned therein in biasing relation to said piston, a spray nozzle on said cap including; associated liquid conduit means communicating with said chamber and liquid discharge control means in said conduit for controlling discharge of liquid from said chamber; and differential pressure operated fluid control means in said container for controlling the passage of said liquid charge into said chamber and venting said receptacle to the atmosphere, the improvement comprising;

said liquid discharge control means comprising a hollow stem, a resilient, expandable hollow valve element in liquid flow communication with said nozzle through said stem and with said chamber, said stem being elongated and terminating interiorly of said element and being movable by said spray nozzle to open said element for discharging liquid from said chamber.

12. The sprayer of claim 11 further including means mounted under said spray nozzle for rendering said nozzle inoperable in one of two positions and operable in the other of said two positions.

13. The sprayer of claim 11 wherein the compressible means biasing said piston urges said piston away from said cap is a spring.

14. The sprayer of claim 11 further including means on said container for determining the end of the charging stroke of said piston in said chamber.

15. The sprayer of claim 13 wherein the compressible means is a spring.

16. The sprayer of claim 15 wherein the spring is a coiled spring.

17. The sprayer of claim 15 wherein the spring is a flat spring.

18. The sprayer of claim 11 wherein said opening for filling said receptacle is a recloseable plug.

19. In a rechargeable liquid sprayer comprising a rotatable container including a receptacle for holding a quantity of liquid, an opening for filling the receptacle with liquid, an inner, pressurizable chamber adapted to receive a charge of liquid from said receptacle, liquid conduit means for conducting said liquid charge from said receptacle to said chamber having a chamber end and a receptacle end, a spray cap rotatably mounted on said container, a piston in said cap adapted to move therein and in said chamber, charging means on said container operatively associated with said piston for moving said piston in said cap and in said chamber when said container is rotated relative to said cap, compressible means in said cap positioned therein in biasing relation to said piston, a spray nozzle on said cap including; associated liquid conduit means communicating with said chamber and liquid discharge control means in said conduit for controlling discharge of liquid from said chamber; and differential pressure operated fluid control means in said container for controlling the passage of said liquid charge into said chamber and venting said receptacle to the atmosphere, the improvement comprising:

said differential pressure operated fluid control means comprising, a first valve element having a peripheral collar sealingly positioned in said receptacle above the chamber end of said liquid conduit means and proximate thereto, said element comprising at least one radially extending suspension arm and a ball cock element attached to the outer extremity thereof, said ball cock positioned over said liquid conduit at said chamber end in normally closed relation thereto, said radial arm having a cross sectional thickness less than said ball cock; and, a second valve element sealingly fitted to said container, said valve element having a resilient body and adapted open and close in response to fluid pressure on one side of said body permitting air to flow into said receptacle.

20. The sprayer of claim 19 wherein said compressible means biasing said piston urges said piston away from said cap.

21. The sprayer of claim 19 further including means mounted under said spray nozzle for rendering said nozzle inoperable in one of two positions and operable in the other of said two positions.

22. The sprayer of claim 19 wherein the opening for filling said receptacle is a recloseable plug.

23. The sprayer of claim 19 wherein the charging means is a cam.

24. The sprayer of claim 19 wherein said elements of said differential pressure operated fluid control means is plastic selected from the group consisting of polyvinyl chloride, polyethylene, polypropylene, synthetic rubber and natural rubber.

25. The sprayer of claim 19 further including means on said container for determining the end of the charging stroke of said piston in said chamber.

26. The sprayer of claim 20 wherein the biasing means is a spring.

27. The sprayer of claim 26 wherein the spring is a coiled spring.

28. The sprayer of claim 26 wherein the spring is a flat spring.

* * * * *

UNITED STATES PATENT OFFICE

CERTIFICATE OF CORRECTION

Patent No. 3940029 Dated February 24, 1976

Inventor(s) William Horvath

It is certified that error appears in the above-identified patent and that said Letters Patent are hereby corrected as shown below:

Column 2, line 25, "buttom" should read -- button --; Column 7, line 45, "botton" should read -- is --; Column 8, line 23 "cutt-" should read -- cut- --.

Signed and Sealed this

*twenty-second* Day of *June 1976*

[SEAL]

*Attest:*

RUTH C. MASON
*Attesting Officer*

C. MARSHALL DANN
*Commissioner of Patents and Trademarks*